United States Patent [19]

Tiegelmann

[11] 4,423,978
[45] Jan. 3, 1984

[54] SHELVING CONSTRUCTION
[75] Inventor: Gabriel Tiegelmann, Aurora, Ill.
[73] Assignee: White Consolidated Industries, Inc., Cleveland, Ohio
[21] Appl. No.: 317,477
[22] Filed: Nov. 2, 1981
[51] Int. Cl.³ .......................... B25G 3/00; F16B 9/00; F16L 41/00
[52] U.S. Cl. .................................... 403/254; 403/201; 248/224.4
[58] Field of Search .............. 403/254, 187, 201, 245, 403/252, 253, 246; 211/103, 186, 187, 189, 190, 191; 248/222.4, 224.4, 225.2; 108/153, 135, 109

[56] References Cited
U.S. PATENT DOCUMENTS 2,992,744 7/1961 Fohm ................................. 108/153
3,100,460 8/1963 McElroy ............................ 108/109
3,879,144 4/1975 Eckerbrecht ....................... 403/232

Primary Examiner—Wayne L. Shedd
Attorney, Agent, or Firm—Pearne, Gordon, Sessions, McCoy, Granger & Tilberry

[57] ABSTRACT

A knockdown metal shelving assembly is disclosed. Upright frame members providing vertical series of equidistantly spaced keyhole slots are interconnected by horizontally extending shelf supports. Interconnection portions of the shelf supports are punch pressed to provide tablike projections that are inserted and retained in associated keyhole slots in the frame members. Each tablike projection includes an arcuate load-bearing portion that rests in contiguous relationship throughout its extent on a corresponding arcuate edge along the bottom of the keyhole slot. That portion of the keyhole slot receiving the load-bearing portion of the tablike projection is slightly undersized to provide an interference fit for lockably retaining the projection in the slot.

7 Claims, 7 Drawing Figures

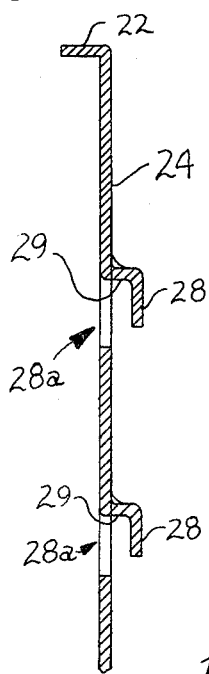
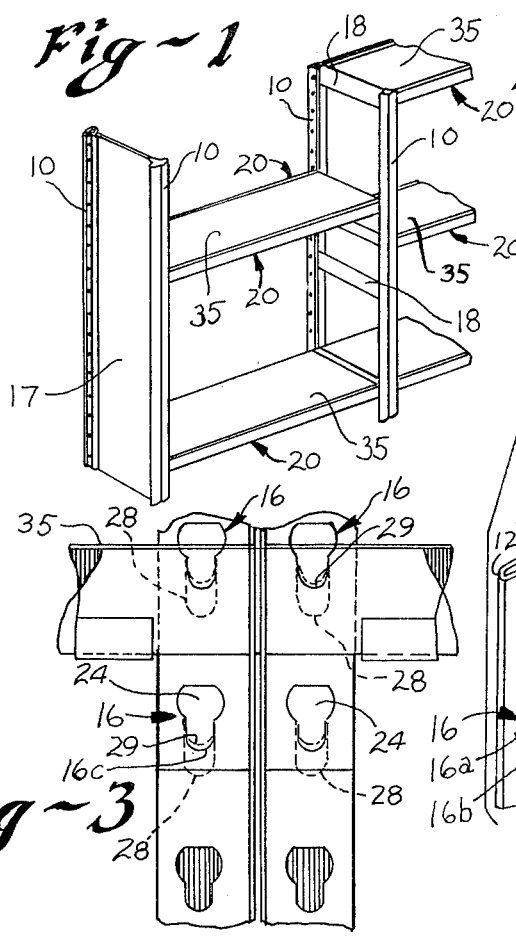
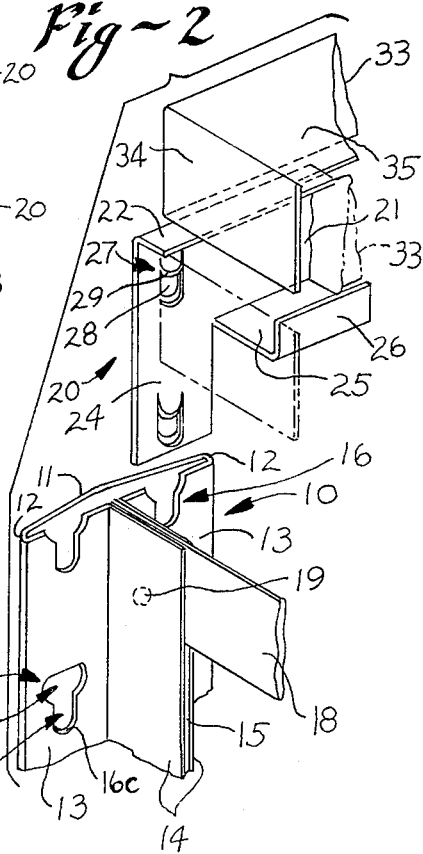
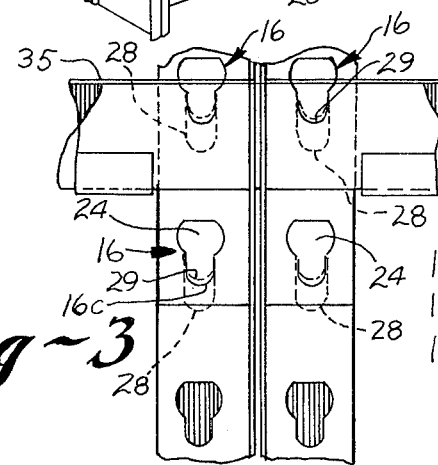
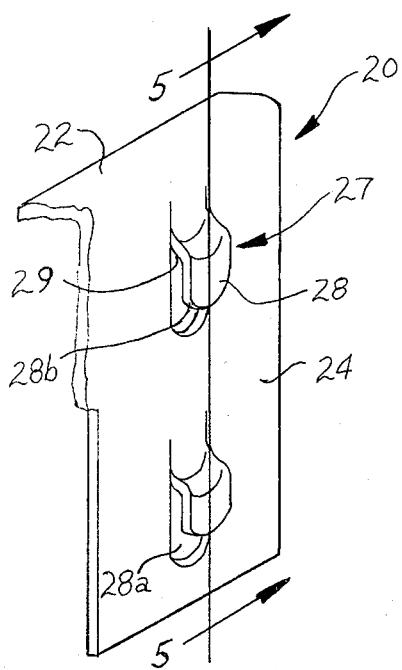
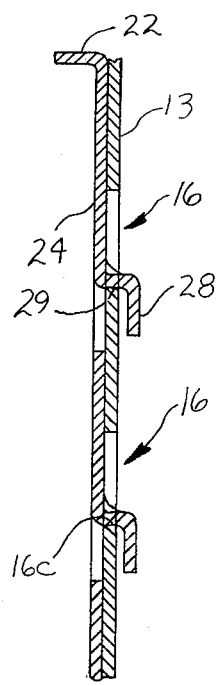
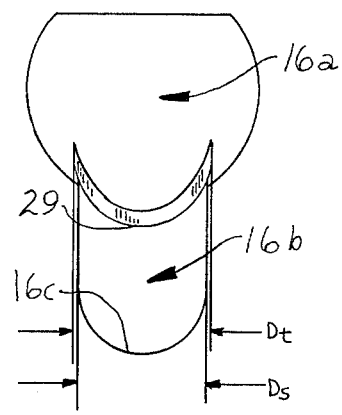

SHELVING CONSTRUCTION

BACKGROUND OF THE INVENTION

The invention relates in general to knockdown shelving units, and in particular to the interconnection between a sheet metal shelf and an associated vertical support member also formed of sheet metal.

U.S. Pat. No. 2,992,744, assigned to the assignee of the present invention, discloses a knockdown shelving unit of the general type to which the present invention is directed. As taught by the '744 patent, a shelf support member is provided with a pair of headed retainer elements or buttons each having an exposed shank portion that engages the bottom edge of an associated keyhole slot provided by a vertical shelf support member. While such a structure adequately interconnects shelves with their associated vertical support members, the provision of each shelf support with a pair of separate retainer elements requires a relatively expensive multi-step manufacturing process. The retainer elements of the '744 patent must each be provided with a head portion, a shank portion, and a reduced end portion that is inserted into a predrilled hole provided in the shelf support. The exposed end of the reduced portion of the retainer must then be upset and peened over to anchor the retainer in position on the shelf support member.

The numerous operations noted above add considerable labor cost to producing a knockdown shelving unit of the type described. Further, excess forces generated on the load-bearing shank portion of the separate retainer element (e.g., by overloading of the supported shelf) may cause fracturing of the peened over reduced end portion anchoring the pin to the associated vertical shelf support. The fracturing of a plurality of retainer element end portions could result in collapse of one or more shelves as the fractured end portions pull out of their respective apertures in the vertical support members.

It would be desirable to provide an improved interconnection structure that is easier to manufacture at a lower cost than the prior art design noted above. Further, the improved structure should be durable and highly reliable under normal conditions as well as under abnormal overloaded conditions.

SUMMARY OF THE INVENTION

The present invention provides a structure for interconnecting elements of a metal shelving assembly wherein a vertically extending slot having an arcuate edge along its lower end is provided by one of the metal shelving elements. A punch press-formed, tablike projection provided as an integral portion of another of the elements is received and retained in the slot. The projection includes an arcuate load-bearing surface that rests on the arcuate edge of the slot in contiguous relationship at all interface points. Preferably, that portion of the slot receiving and engaging the projection is undersized to provide an interference fit with the projection to releasably lock the elements together in assembled relation. The tablike projection preferably includes a downwardly projecting, tonguelike portion that overlaps a portion of the slot providing member to maintain the position of the load-bearing surface in engagement with the lower edge of the slot.

As an integrally formed portion of one of the shelving elements, the tablike projection has been found to be very strong and rugged as compared to other prior art structures. Further, the tablike projection can be formed in a one-step stamping operation as compared to multi-step processes of the prior art that add cost to the manufacture of shelving units of the type under consideration.

A fuller understanding of the invention may be had by referring to the following description and claims taken in conjunction with the accompanying drawing.

BRIEF DESCRIPTION OF THE DRAWINGS

FIG. 1 is a perspective view of a knockdown sheet metal shelving assembly in accordance with the present invention;

FIG. 2 is an exploded perspective view of an interconnection portion of the shelving assembly illustrated in FIG. 1;

FIG. 3 is an elevational view of an interconnection portion of the shelving assembly illustrated in FIG. 1;

FIG. 4 is a sectional, perspective view of the tablike projection providing shelf support element as illustrated in FIG. 2;

FIG. 5 is a cross-sectional view of the shelf support element in FIG. 4 taken along line 5—5;

FIG. 6 is a cross-sectional view of the vertical support element of FIG. 2 in assembled relationship with the shelf support element as illustrated in FIG. 5; and FIG. 7 is a schematic representation of the relative dimensions of a tab receiving portion of a slot and that portion of a tab received in the tab receiving slot portion.

DETAILED DESCRIPTION OF THE PREFERRED EMBODIMENT

With reference to FIG. 1, there is illustrated in perspective view a knockdown sheet metal shelving assembly of the general type illustrated in U.S. Pat. No. 2,992,744, assigned to the assignee of the present invention, the entirety of which is incorporated herein by reference. The shelving assembly includes sheet metal-formed vertical supports or uprights 10 arranged in pairs. Each pair is comprised of two equidistantly spaced, upright supports 10 spaced in parallel relation from each other by two or more cross support sheet metal strips 18 or a continuous sheet metal side panel 17, as illustrated in FIG. 1. At least two pairs of vertical supports or uprights 10 are held in spaced position and connected together by a plurality of pairs of shelf support members 20 extending horizontally in a common plane between the uprights 10. A pair of shelf support members 20 are provided for each sheet metal shelf 35 that rests on and is supported by each pair of horizontal support members 20. A plurality of pairs of upright supports 10, pairs of horizontal shelf support members 20, and sheet metal shelves 35 can be assembled to provide a variety of modular sheet metal shelving assemblies suitable for numerous article storage purposes.

The present invention is directed to the interconnection structure between the ends of the horizontal shelf support members 20 and the associated vertical supports or uprights 10.

With reference to FIG. 2, there is illustrated in exploded view a section of a vertical upright 10. The upright 10 includes a main wall portion 11 bent along its longitudinal, vertical centerline to define two halves. The outer ends of the main wall portion 11 are defined by bent portions 12. A pair of web portions 13 lying in a common plane extend inwardly from the bent portions 12 and lie generally parallel to the main wall portion 11 but spaced therefrom to a slight degree. The inward ends of the web portions 13 have extending perpendicularly from them a pair of outturned parallel flanges 14 spaced from each other to define a throat or channel 15 that receives an end of the cross support 18 (or the sheet metal side panel 17 of FIG. 1) spot-welded at 19 in position between the outturned flanges 14, as illustrated. The web portions 13 are each provided with a vertical series of equidistantly spaced keyhole apertures or slots 16. The vertical rows of slots 16 are parallel to each other, as more clearly illustrated in FIG. 3. As shown in FIG. 2, each keyhole slot 16 is defined by an upper section 16a, a lower, narrower tab receiving section 16b, and an arcuate lower edge 16c.

With further reference to FIG. 2, one end of the two-ended shelf support member 20 (FIG. 1) is illustrated, each end including a vertical side body portion 21 having at its upper edge a shelf-supporting flange 22 that extends horizontally when the shelf support 20 is interconnected between two vertical supports 10, as illustrated in FIG. 1. The shelf-supporting flange 22 supports the sheet metal shelf 35 having a longitudinal shelf-length depending flange 33 and a shorter transverse depending flange 34 defining the width of the shelf. A rebent flange or horizontal portion 25 extending horizontally from the lower end of the vertical side body portion 21 in a plane parallel to the shelf support flange 22 provides at its end away from the vertical side body portion 21 an upturned lip 26 which along its upper end also supports the shelf 35. Each end of the shelf support 20 also includes a gusset portion 24.

The interconnection ends of the shelf support 20 as thus far described are known in the prior art and are also illustrated in the earlier-incorporated U.S. Pat. No. 2,992,744. Further, the general overall shelving arrangement of FIG. 1, the vertical support structure 10, the shelf 35, and the mid-section of the shelf support 20 are all known in the art, as illustrated by the '774 patent.

In accordance with the present invention, each of the gusset portions of the shelf support members 20 is punch-pressed to provide one or more tablike retainer elements 27 preferably in a single stamping operation. Each tablike retainer element 27 includes an arcuate load-bearing portion 29 that is designed to rest on the associated, arcuate, lower edge 16c of an associated slot, a constant width tongue portion 28 of each tablike retainer element 27 being initially inserted into the upper section 16a of an associated slot. Upon insertion of the tongue portion 28 into the keyhole slot 16, the load-bearing portion 29 of the retainer element 27 is forced downwardly into the narrower throatlike section 16b of an associated slot until the arcuate lower edge 16c is in contiguous relationship to all interface points with the load-bearing portion 29.

The interconnection position of the elements of FIG. 2 is illustrated in FIG. 3, wherein it can be seen that four of the slots 16 have received and are retaining four tablike retainer elements 27 each having a tongue portion 28. The bottom lower edge 16c sturdily supports at all points an associated load-bearing portion 29 of the associated tablike punch press-formed retainer elements 27.

With reference to FIG. 4, there is illustrated in perspective view a section of the gusset portion 24 of the horizontal shelf support members 20. Each tablike retainer element 27 can more clearly be seen to include the tongue portion 28 and the load-bearing portion 29, both formed from the material stamped out of an aperture 28a in the gusset portion 24. The lower arcuate end 28b at the tongue portion 28 generally matches the arcuate dimension (e.g., radius of curvature) of the load-bearing portion 29, as well as the arcuate lower edge 16c (FIGS. 2 and 3). This facilitates insertion of each retainer 27 into an associated slot 16.

It can be seen from FIG. 5 that the tongue portion 28 is spaced from the adjacent face of the gusset portion 24 by a distance equal to the transverse extent of the arcuate load-bearing portion 29.

With reference to FIG. 6, the distance between the tongue portion 28 and the associated gusset 24 is slightly greater than the thickness of the associated web portion 13 of the vertical upright 10 so as to facilitate assembly of the members 10, 20 (FIG. 1) into interconnecting relationship. Furthermore, it can be seen that portions of the gusset 24 immediately below the slots 16 are trapped and retained between the tongue portion 28 and the gusset 24 to maintain the load-bearing portions 29 in position on the lower edges 16c of the slots 16.

As schematically illustrated in FIG. 7, it is preferred that the load-bearing portion 29 received into the narrower throat section 16b of the slot provide an interference fit to releasably lock the members 10, 20 in interconnecting relationship until their intentional disassembly by hammering or otherwise forcing of the members 10,20 apart. An interference fit is provided by making the width $D_s$ of the slot portion 16b slightly narrower than the width $D_t$ of the tablike load-bearing portion 29. As the load-bearing portion 29 is forced downwardly into the throat portion 16b of the associated slot, an interference fit is provided to tightly engage the members 10, 20 relative to each other with the load-bearing portion 29 having a radius of curvature substantially identical to the radius of curvature defining the arcuate lower edge 16c of the slot wherein the portion 29 and the support edge 16c are in contiguous relation.

It has been found that the tablike retainer element 27, being integrally formed of sheet metal comprising the gusset portion 24, is very strong and durable, even under overload conditions. Further, in manufacturing the interconnection structure of the present invention, the tablike retainer elements 27 can be simply and inexpensively provided in one step by a suitable stamping operation.

Although the preferred embodiment of this invention has been shown and described, it should be understood that various modifications and rearrangements of the parts may be resorted to without departing from the scope of the invention as disclosed and claimed herein.

What is claimed is:

1. A structure for interconnecting elements of a metal shelving assembly comprising:

a vertically extending slot provided by one of the elements, the slot having an arcuate edge along its lower end; and a punch press-formed, tablike projection provided as an integral portion of another of the elements, the projection being received by and retained in the slot, the projection including an arcuate load-bearing surface resting on the arcuate edge of the slot in contiguous relationship at all interface points between the arcuate edge and the arcuate load-bearing surface.

2. A structure according to claim 1, wherein that portion of the slot receiving and engaging the projection is undersized to provide an interference fit with the projection to releasably lock the elements together in assembled relationship.

3. A structure according to claim 1, wherein the tablike projection includes a tongue portion extending downwardly from the arcuate load-bearing surface, the tongue portion being spaced from said another element, the space receiving a portion of said one of the elements to maintain the position of the load-bearing surface in engagement with the arcuate lower edge of the slot.

4. A structure according to claim 3, wherein the distal end of the tongue portion is arcuate, the radii of curvature of the arcuate load-bearing surface, the arcuate edge, and the distal end of the tongue portion being equal to facilitate insertion of the tablike projection into the slot.

5. A structure according to claims 3 or 4, wherein the slot is a keyhole slot having a larger width across its top section as compared to its bottom section.

6. A structure according to claim 5, wherein the width of the tongue portion is substantially less than the width of the top section of the slot.

7. A structure according to claim 6, wherein the width of the tongue portion is constant throughout its length.

* * * * *